United States Patent
Grisley

[11] Patent Number: 5,114,265
[45] Date of Patent: May 19, 1992

[54] INTERLOCKING ROUTED JOINT

[76] Inventor: Kenneth M. Grisley, P.O. Box 4646, Quesnel, B. C., Canada, V2J 3J8

[21] Appl. No.: 685,347

[22] Filed: Apr. 15, 1991

[51] Int. Cl.⁵ .......................... F16B 12/00; B27C 5/00; B27F 1/14
[52] U.S. Cl. ...................... 403/381; 217/65; 144/85; 144/144 R; 144/347; 144/372; 144/144.5 R; 403/382; 403/403
[58] Field of Search ................ 403/381, 382, 403; 409/130, 182; 144/85, 87, 134 R, 144 R, 144 S, 372, 137, 347; 217/65

[56] References Cited

U.S. PATENT DOCUMENTS

| | | |
|---|---|---|
| 16,557 | 2/1857 | Stimpson . |
| 435,759 | 9/1890 | Marter . |
| 517,348 | 3/1894 | Linderman . |
| 637,212 | 11/1899 | McCune . |
| 661,542 | 11/1900 | Linderman . |
| 671,954 | 4/1901 | Eaton . |
| 776,942 | 12/1904 | Rice . |
| 944,489 | 12/1909 | Linderman . |
| 1,052,600 | 2/1913 | Linderman . |
| 1,067,910 | 7/1913 | Florey . |
| 1,122,350 | 12/1914 | Wysong . |
| 1,245,240 | 11/1917 | Kelly . |
| 1,424,481 | 8/1922 | Isoardi . |
| 2,496,184 | 1/1950 | Von Canon . |
| 2,520,221 | 8/1950 | Ponty .................................. 20/92 |
| 3,078,888 | 2/1963 | Bruemmer . |
| 3,090,086 | 5/1963 | Fata .................................... 20/92 |
| 3,232,327 | 2/1966 | Baranczyk ....................... 144/85 |
| 3,591,212 | 7/1971 | Rhyne ......................... 287/20.92 D |
| 3,692,201 | 9/1972 | Garduna ........................... 217/12 |
| 4,025,215 | 5/1977 | Murdock et al. ................ 403/381 |
| 4,128,119 | 12/1978 | Maier . |
| 4,168,730 | 9/1979 | Keller . |
| 4,173,287 | 11/1979 | Kumakawa ..................... 217/65 |
| 4,428,408 | 1/1984 | Grisley ...................... 144/144.5 R |
| 4,607,673 | 8/1986 | McCord ..................... 144/144.5 R |
| 4,632,159 | 12/1986 | Glasgo ............................ 144/85 |
| 4,809,755 | 3/1989 | Pontikas ......................... 144/372 |
| 4,875,510 | 10/1989 | Muellers ....................... 144/145 A |

Primary Examiner—W. Donald Bray
Attorney, Agent, or Firm—Townsend and Townsend

[57] ABSTRACT

An interlocking joint for joining two panels together has curved jigsaw shaped indents and protrusions on edges of both panels that fit together and cannot pull apart. The indents and protrusions are cut by a router with a straight sided cutter. A template is provided for guiding a bushing on a cutter shaft of a router and the template takes into account the bushing having a larger diameter than the cutter. There is also a jig provided that has fingers that are asembled to cut out the interlocking joint with a router.

20 Claims, 3 Drawing Sheets

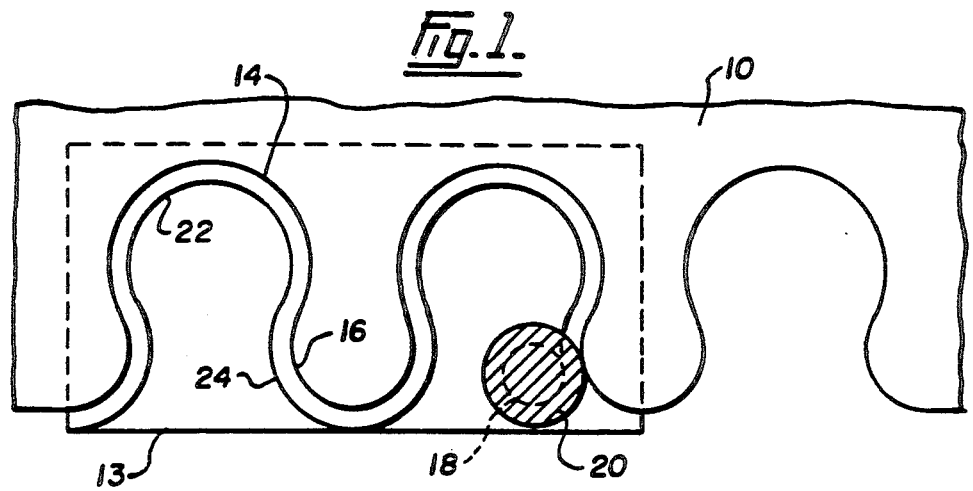
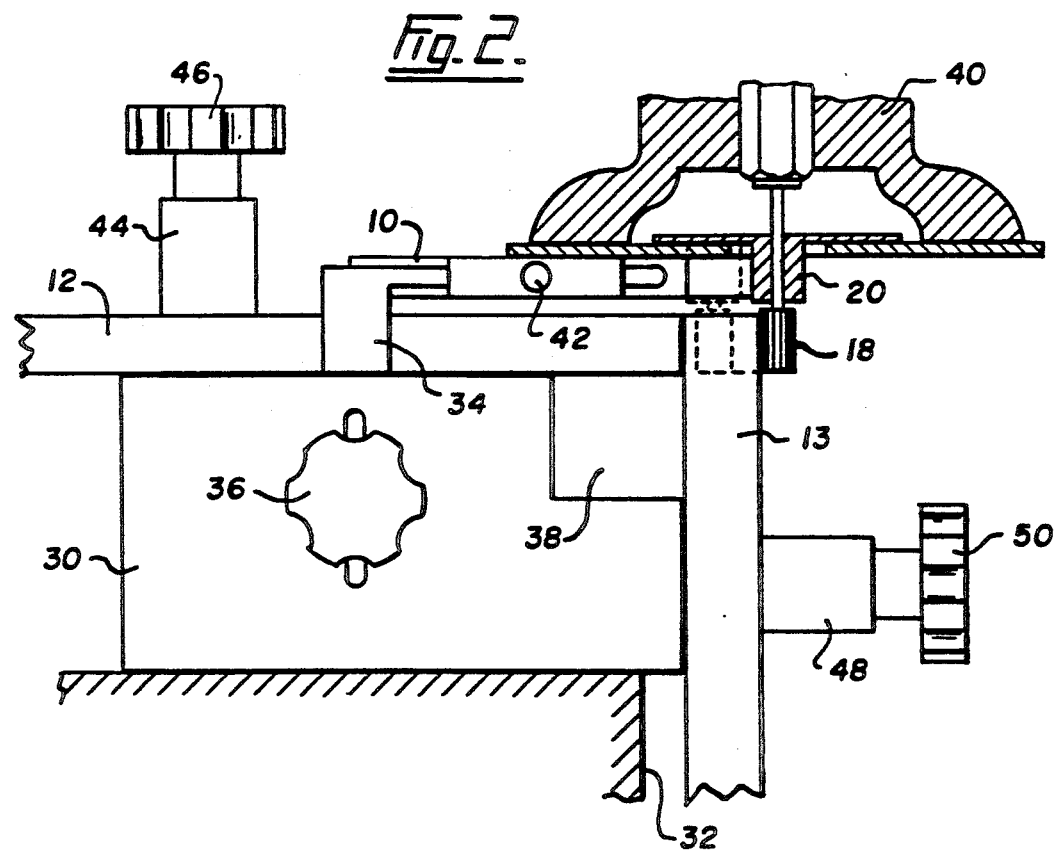

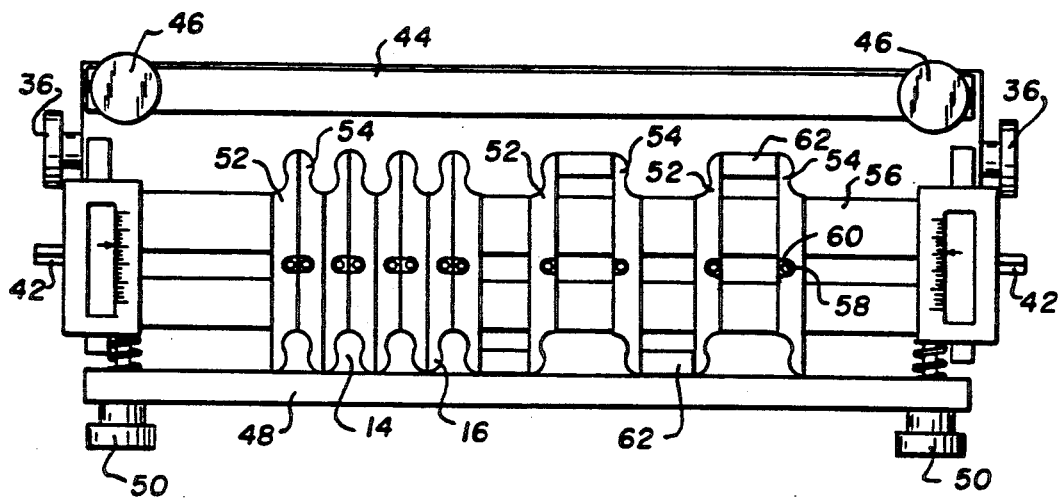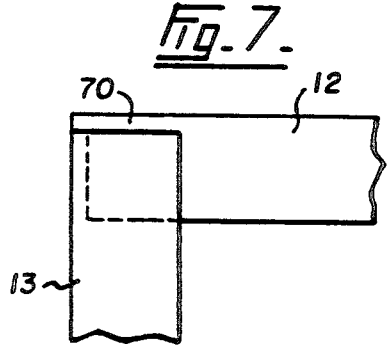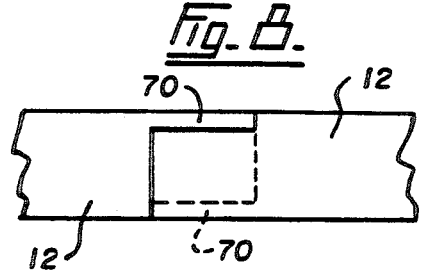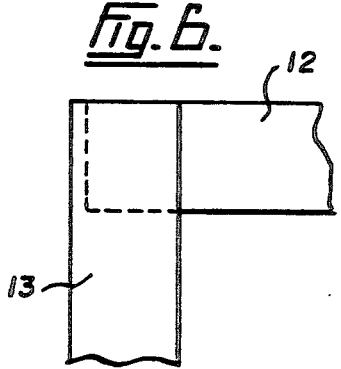

INTERLOCKING ROUTED JOINT

TECHNICAL FIELD

The present invention relates to a mechanically interlocking joint suitable for joining boards or panels together primarily in the woodworking field. More specifically the present invention provides a jig for cutting a special mechanical interlocking joint with a router having a straight sided cutter.

BACKGROUND ART

Mortise and tenon joints and dovetail joints for joining the ends of wooden boards together were originally cut by hand using saw and chisel. Routed joints made with a hand held router are used today and try to duplicate this type of hand joinery.

The only true mechanical routed interlocking joint is a dovetail joint and in common forms of through dovetail, half blind dovetail and sliding dovetail are all routed on different types of templates with a tapered or dovetail cutter. In one embodiment a full blind dovetail is made with a router as described in U.S. Pat. No. 4,025,215.

All of these joints are formed using a router with either a dovetail cutter alone or with a dovetail cutter on one element and a straight sided cutter on the other. There is no mechanically interlocking joint and no means of forming a mechanically interlocking joint using a router with only a straight sided cutter on both halves of the joint.

DISCLOSURE OF INVENTION

It is an aim of the present invention to provide a mechanical interlocking joint that uses a router with straight sided cutter on both halves of the joint. The joint may be used for joining wooden boards at their end grain edges or composite material sheets or plates at any edge, generally at 180° or at 90°, however, other angles as required may be cut. The two halves of the joint are formed by a router having a straight sided cutter, either separately or simultaneously. A jig or template for the cutter may be formed from variably spaced double ended fingers such as that shown in my U.S. Pat. No. 4,428,408 with guide rails and bridging pieces.

The present invention provides an interlocking joint for joining two panels together comprising two panels having edges to be joined, the edge of both panels having curved jigsaw puzzle shaped protrusions with a curved jigsaw puzzle shaped indents between the protrusions, such that the protrusions and indents on the edge of one panel interlock with the indents and protrusions on the edge of the other panel, the sides of the protrusions being substantially perpendicular to surface faces of the protrusions.

The present invention also provides a method of forming a joint for joining two wooden boards together comprising cutting curved jigsaw puzzle shaped protrusions with adjacent indents between the protrusions along an edge of a first panel, cutting curved jigsaw puzzle shaped indents with adjacent protrusions between the indents along an edge of a second panel so that the protrusions and adjacent indents along the edge of the first panel interlock with the indents and adjacent protrusions along the edge of the second panel, the sides of the protrusions being substantially perpendicular to surface faces of the protrusions.

In a further embodiment, there is provided a template for supporting and guiding a router to cut joint members in panels to form an interlocking joint, the template comprising a form having one side with curved jigsaw puzzle shaped indents with protrusions between the indents, the protrusions and indents in line to form a jigsaw shape, the protrusions being smaller than the indents by a dimension representing a difference in radius between a router bushing and a router cutter, the router bushing having a larger diameter than the router cutter, the template adapted to cut jigsaw puzzle shaped protrusions and indents in the panels that are of the same size when the router bushing follows the template side.

In yet a further embodiment, there is provided a jig for supporting and guiding a router to cut joint members in work pieces to form an interlocking joint comprising a plurality of fingers with first fingers each having an S-shaped end interspaced with second fingers each having a reversed S-shaped end, to form a plurality of curved jigsaw puzzle shaped protrusions with indents between the protrusions, means to clamp the fingers in line, and guide means to guide router with a straight sided cutter to follow the curved jigsaw shaped protrusions and indents formed by the fingers.

BRIEF DESCRIPTION OF DRAWINGS

In drawings which illustrate embodiments of the present invention,

FIG. 1 is a plan view of one embodiment showing a template for cutting jigsaw puzzle shaped indents and protrusions for forming an interlocking joint for two boards, FIG. 2 is a side view of a jig with clamps to hold boards vertically and horizontally including a router resting on a template or fingers to cut the jigsaw shaped indents and protrusions, FIG. 3 is a plan view of a plurality of fingers arranged to form a template on the jig shown in FIG. 2, FIG. 6 is a side view showing the joint of FIGS. 4 and 5.

FIG. 7 is a side view showing a different type of interlocking joint according to the present invention, FIG. 8 is a side view showing an embodiment of an interlocking joint with the boards in line.

BEST MODE FOR CARRYING OUT THE INVENTION

Figure 4:
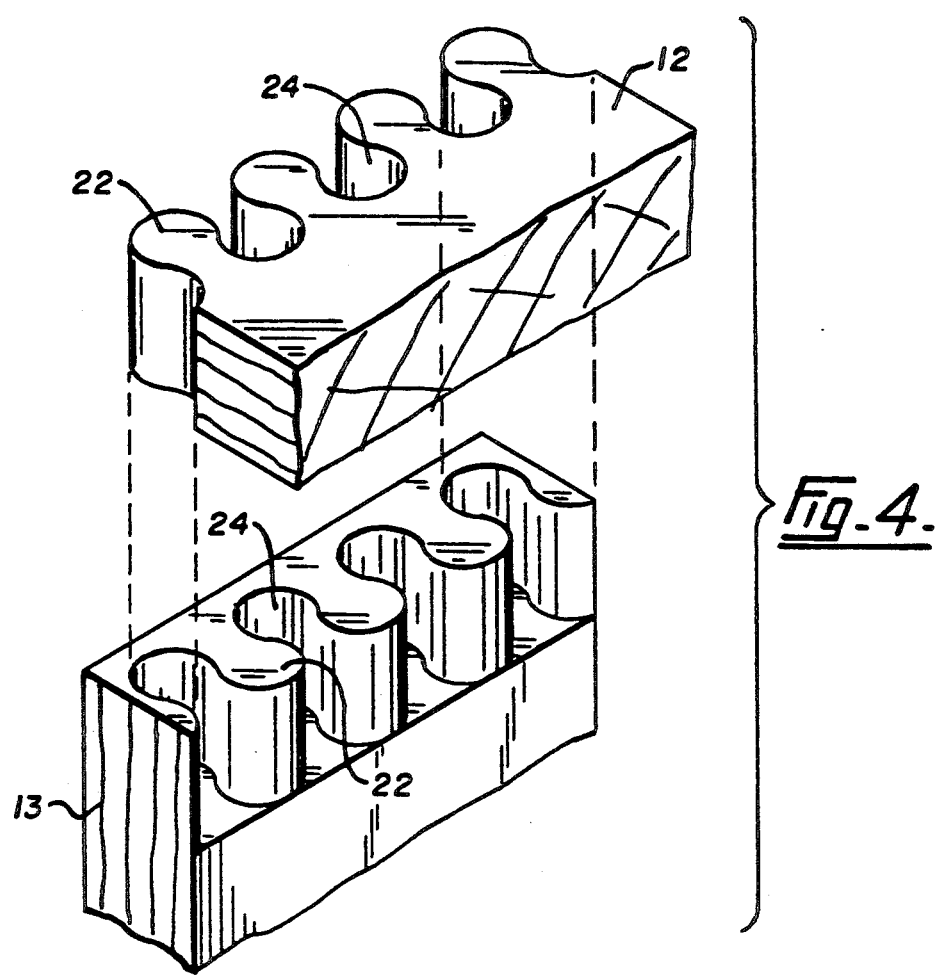
FIG. 4 is an isometric view showing two joint members of an interlocking joint according to one embodiment of the, present invention.

A template 10 suitable for cutting an interlocking joint according to the present invention is shown in FIG. 1. A board 13 is shown with one end vertical. The template has an indent 14 followed by a protrusion 16. A router 20 with a larger diameter than the cutter 18. The bushing 20 follows the contours of the indents 14 and protrusions 16 to form cutout indents 22 and cutout protrusions 24 in the board 13. The cutout indents 22 are exactly the same size as the protrusions 24 and have appropriate tolerances for adhesive when two board ends are joined together in a 90° corner joint, a 180° straight in line joint, an obtuse joint or an acute joint.

The cutout in one board is arranged to mate with a cutout in a second board which has moved over half a pitch of the protrusion and indent, so that the two boards line up when they are joined together to form an interlocking joint.

In one embodiment, the diameter of the bushing 20 is ⅜ inch and the diameter of the cutter 18 is ½ inch. For smaller indents and protrusions, the bushing diameter is 7/16 inch and the cutter diameter is 5/16 inch. The cutout indents 22 and protrusions 24 are typically a jigsaw puzzle configuration which cannot be pulled apart, only lifted to separate the two boards.

The template 10 is shown in FIG. 1 having only one row of indents 14 and protrusions 16, however the template may be double sided with a row of indents 14 and protrusions 16 on a parallel side arranged to be offset by a half pitch. Alternatively, guides are provided on the template so that one board is positioned to be offset by a half pitch so when cut the boards are aligned. In yet another embodiment if the template 10 is double sided, one row of protrusions and indents may be a different size to the other row of protrusions and indents.

FIG. 2 illustrates a side view of a jig body 30 for mounting on a bench 32. The jig body has the template 10 supported on a template bracket 34 which can be raised and lowered from the jig body 30 by the knob 36. A space 38 is provided in the top corner of the jig body 30 to allow movement of the cutter 18. A hand held router 40 is shown resting on the template 10 with the bushing 20 engaging the indents 14 and protrusions 16 as shown in FIG. 1. The template bracket 34 has a scale thumb screw 42 for positioning the template 10 longitudinally. A scale (not shown) permits measurement for positioning the template 10.

A horizontal clamp beam 44 holds a board 12 horizontally on the jig body 30. Clamp knobs 46 permit the clamp beam 44 to be forced against the board 12. Similarly a vertical clamp beam 48 with clamp knobs 50 clamp a board 13 in the vertical position.

FIG. 3 illustrates a plan view of a jig arrangement similar to that shown in FIG. 2, but the template is replaced with a series of fingers to make up the template. First fingers 52 have an S-shaped end at both ends representing one-half of a protrusion 16 and one-half of an indent 14. Second fingers 54 have a reverse S-shaped end at both ends. When first fingers 52 and second fingers 54 are placed side-by-side they provide a protrusion 16 on one side, an indent 14 on the other side and vice versa. This provides half a pitch out of line between the two sides so that a board lined up and cut on one side will exactly match a board lined up and cut on the other side.

Each of the fingers 52 and 54 fit on two guide rails 56 which extend across the jig body 30. Set screws 58 set in cutouts 60 clamp the fingers 52 and 54 to the guide rails 56. In the embodiment shown on the right hand side of FIG. 3, bridge pieces 62 are inserted between first fingers 52 and second fingers 54 so that elongated or wider indents and protrusions are provided. By utilizing bridge pieces 62 in different widths and arrangements, different sizes and patterns of cutouts are formed.

Figure 5:
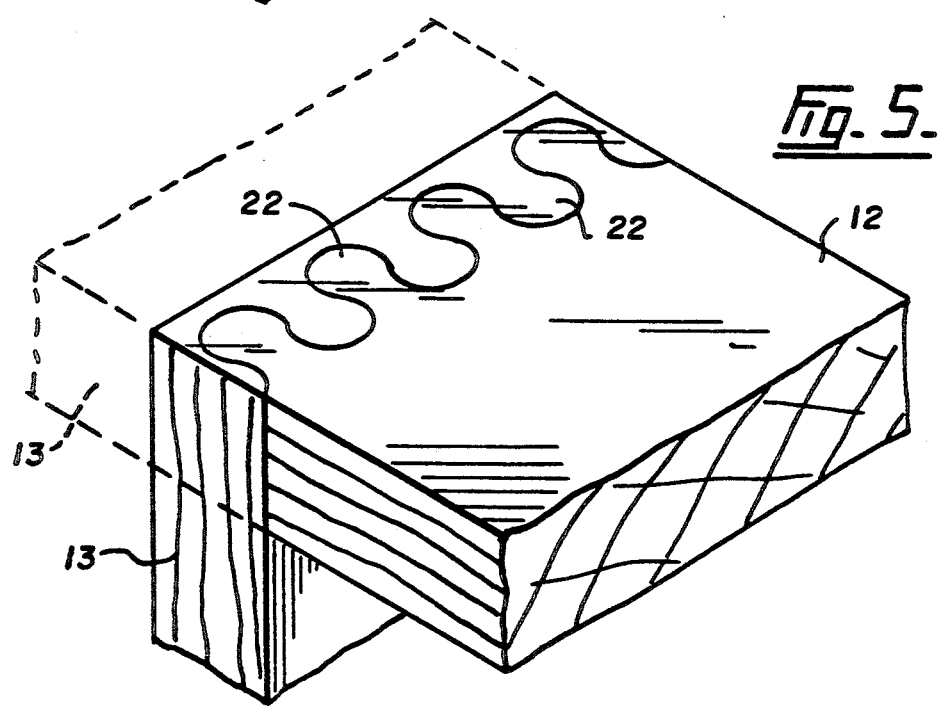
FIG. 5 is an isometric view showing the two joint members of the joint shown in FIG. 4 assembled together.

FIGS. 4 and 5 illustrate one example of a jigsaw puzzle interlocking joint as disclosed herein. A top board 12 has the joint member cut with the board positioned horizontally. The cutter 18 has cut completely through the board 12 to provide a through joint. Protrusions 22 and indents 24 are arranged with curved edges so that when assembled with an adjacent joint member they will not pull apart, thus providing a true mechanical interlocking joint. The lower board 13 has the joint member cut with the board 13 positioned vertically. Thus when the top board 12 is lowered down onto the bottom board 13, a corner joint is provided as shown in FIG. 5. The protrusions 22 of both joint members extend and lock into the indents 24 of the other joint member with substantially no spaces there between. The interlocking joint cannot be pulled outwards, only moved vertically upwards. As shown in the dotted line of FIG. 5, the interlocking joint may have the other board 13 cut at 90° to the board surface to provide a 180° joint.

FIG. 6 shows the joint illustrated in FIGS. 4 and 5. This joint is a half blind joint that can be seen on the surface of board 12. In this case, the cutter has cut right through the board 12. FIGS. 7 and 8 illustrate full blind joints where the cutter has not cut right through the board 12 but left a strip 70 on the surface of the board 12. Thus looking on the surface of board 12, no joint is visible. FIG. 7 illustrates a 90° joint with a horizontal board 12 engaging with a vertical board 13. The strip 70 extends right to the outside surface of the vertical board. Thus, a full blind joint is formed with a straight line visible when looking at the outside surface of the vertical board 13.

FIG. 8 shows a full blind 180° joint wherein a strip 70 is provided at the top of the board on the left and a second strip 70 is provided at the bottom of the board on the right to provide a full blind joint so that only the straight join lines are seen on the top and bottom surfaces of the boards.

The joint members of the interlocking joint are identical and regular mirror images of each other, one half being offset from the other by half the pitch of the joint member. In forming the indents 14 and protrusions 16 of the template 10, the diameter of the bushing 20 which follows the indents 14 and protrusions 16 is generally larger than the cutter and the fingers are designed so that the cutter cuts out the desired profile of the jigsaw puzzle configuration. Adhesive may be used on assembly to keep the joint members together, however the increased strength of the interlocking joint is in the jigsaw puzzle configuration which does not permit a protrusion pulling out of an indent.

Whereas a non-rotating bushing 20 is shown on the cutter shaft of the router 40, this may be replaced by a small bearing to reduce friction. The bearing would generally be larger than the diameter of the cutter, but not necessarily so. In which case the template dimensions would be changed accordingly.

Various changes may be made to the embodiments shown herein without departing from the scope of the present invention which is limited only by the claims. For instance, the size of the interlocking elements can be changed for different wood panel types. Whereas a simple jigsaw puzzle arrangement is illustrated herein, this could be changed to a more exotic design for a particular decorative feature. The potential number of designs for templates is almost unlimited depending upon practical design considerations.

The embodiments of the present invention in which an exclusive property or privilege is claimed are defined as follows:

1. An interlocking joint for joining two panels together comprising:

two panels having edges to be joined, the edges of both panels having curved jigsaw puzzle shaped protrusions with curved jigsaw puzzle shaped indents between the protrusions, such that the protrusions and indents on the edge of one panel interlock with the indents and protrusions on the edge of the other panel, the sides of the protrusions being substantially perpendicular to surface faces of the protrusions.

2. The interlocking joint according to claim 1 wherein the panels are perpendicular one to the other.

3. The interlocking joint according to claim 1 wherein the panels are substantially in line.

4. The interlocking joint according to claim 3 wherein the joint is half blind with the interlocking protrusions and indents visible from one side only.

5. The interlocking joint according to claim 3 wherein the joint is full blind with the interlocking protrusions and indents not visible from either side.

6. A method of forming a joint for joining two wooden boards together, comprising:
cutting curved jigsaw puzzle shaped protrusions with adjacent indents between the protrusions along an edge of a first panel,
cutting curved jigsaw puzzle shaped indents with adjacent protrusions between the indents along an edge of a second panel so that the protrusions and adjacent indents along the edge of the first panel interlock with the indents and adjacent protrusions along the edge of the second panel, the sides of the protrusions being substantially perpendicular to surface faces of the protrusions.

7. The method of forming a joint according to claim 6 wherein the cutting occurs with a router having a straight sided cutter.

8. The method of forming a joint according to claim 7 wherein the router has a non-rotating guide bushing above the cutter, the guide bushing having a diameter greater than the cutter and a template on which the router is supported, the template having one side with curved jigsaw puzzle shaped indents with protrusions between the indents, the protrusions being larger than the indents by a dimension representing the difference in radius between the bushing and the cutter such that when the bushing of the router follows the indents and protrusions of the template, the jigsaw puzzle shaped protrusions in the first and second panels are substantially the same size as the indents in the first and second panels.

9. The method of forming a joint according to claim 6 wherein both wooden boards have protrusions with sides substantially perpendicular to the surface of the wooden boards to form an in line joint.

10. The method or forming a joint according to claim 6 wherein one of the wooden boards has protrusions with sides substantially perpendicular to the surface of the one wooden board and the other wooden board has protrusions substantially parallel to the surface of the other wooden panel to form a 90° joint.

11. A template for supporting and guiding a router to cut joint members in panels to form an interlocking joint, the template comprising:
a form having one side with curved jigsaw puzzle shaped indents with protrusions between the indents, the protrusions and indents in line to form a jigsaw shape, the protrusions being smaller than the indents by a dimension representing a difference in radius between a router bushing and a router cutter, the router bushing having a larger diameter than the router cutter, the template adapted to permit cutting jigsaw puzzle shaped protrusions and indents in the panels t at are of the same size when the router bushing follows the template side.

12. The template according to claim 11 including means to clamp a first panel to the jig at a location offset by a half pitch of the protrusions and indents from a second panel, so that the first panel and second panel when joined are aligned.

13. The template according to claim 11 including means to clamp a panel to the template so the router cuts the protrusions with sides substantially perpendicular to a surface of the panel.

14. The template according to claim 11 including means to clamp a panel to the template so the router curs the protrusions with sides substantially parallel to a surface of the panel.

15. A jig for supporting and guiding a router to cut joint members in work pieces to form an interlocking joint comprising:
a plurality of fingers with first fingers each having an S-shaped end interspaced with second fingers each having a reversed S-shaped end to form a plurality of curved jigsaw puzzle shaped protrusions with indents between the protrusions,
means to clamp the fingers in line, and
guide means to guide a router with a straight sided cutter to follow the curved jigsaw puzzle shaped protrusions and indents formed by the fingers.

16. The jig according to claim 15 wherein the guide means comprises a non-rotating guide bushing about a router cutter shaft.

17. The jig according to claim 15 including bridges positioned between the plurality of fingers.

18. The jig according to claim 15 wherein the first fingers have an S-shaped end on both ends, the second fingers have a reverse S-shaped end on both ends, and the fingers are clamped in the approximate center so protrusions and indents can be cut in work pieces at both ends of the fingers.

19. The jig according to claim 15 including means to clamp a work piece to the jig so the router cuts the protrusions with sides substantially perpendicular to the surface of the work piece.

20. The jig according to claim 15 including means to clamp a work piece to the jig so the router cuts the protrusions with sides substantially parallel to the surface of the work piece.

* * * * *